United States Patent [19]

Takatoh et al.

[11] Patent Number: 4,976,887

[45] Date of Patent: Dec. 11, 1990

[54] OPTICALLY ACTIVE LIQUID CRYSTAL COMPOUND AND METHOD OF MANUFACTURING THE SAME, LIQUID CRYSTAL COMPOSITION CONTAINING THE SAME AND LIQUID CRYSTAL DISPLAY DEVICE

[75] Inventors: Kohki Takatoh, Ayase; Masanori Sakamoto, Kawasaki; Kazuyuki Sunohara, Tokyo, all of Japan

[73] Assignee: Kabushiki Kaisha Toshiba, Kawasaki, Japan

[21] Appl. No.: 275,383

[22] Filed: Nov. 23, 1988

[30] Foreign Application Priority Data

Jan. 21, 1988 [JP] Japan .................................. 63-9616

[51] Int. Cl.$^5$ ....................... C09K 19/32; C07C 69/76
[52] U.S. Cl. .......................... 252/299.62; 252/299.01; 350/350.5; 560/51; 560/53; 560/56; 560/73; 560/107; 560/108
[58] Field of Search ....................... 252/299.01, 299.62; 350/350 S; 560/51, 53, 56, 73, 107, 108

[56] References Cited

U.S. PATENT DOCUMENTS 4,545,921 10/1985 Dubois et al. ................... 252/299.62
4,886,620 12/1989 Hopf et al. .................. 252/299.62 X

FOREIGN PATENT DOCUMENTS

| 113293 | 7/1984 | European Pat. Off. ........ 252/299.01 |
| 61-43 | 1/1986 | Japan . |
| 63-83191 | 4/1988 | Japan ..................................... 560/56 |
| 63-291981 | 11/1988 | Japan .............................. 252/299.01 |

OTHER PUBLICATIONS

Takatoh et al., Mol. Cryst. Liq. Cryst., vol. 164, pp. 167–178 (Nov. 1988).
Demus et al. (ed.), Flussige Kristalle in Tabellen, pp. 328–332 (1984).
Davison et al., Mol. Cryst. Liq. Cryst., vol. 129, pp. 17–35 (1985).
Gray et al., Liquid Crystals & Plastic Crystals, vol. 1, pp. 142–143 (1973).
Molecular Crystals and Liquid Crystals, vol. 129, No. 1/3, 1985, pp. 17–35, Gordon and Breach, Science Publishers Inc., London, GB; I. R. Davison et al.: "Fluorene analogues of biphenyls: Comparison of mesogenic behaviour".

(List continued on next page.)

*Primary Examiner*—John S. Maples
*Assistant Examiner*—Richard Treanor
*Attorney, Agent, or Firm*—Oblon, Spivak, McClelland, Maier & Neustadt

[57] ABSTRACT

A compound represented by formula:

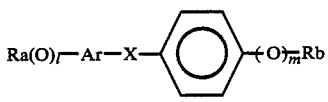

In the formula, Ar represents

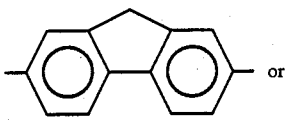 or

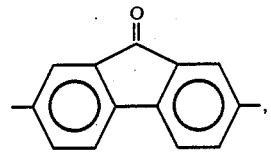

, and each of Ra and Rb independently represents an optically non-active alkyl group or an optically active group having an asymmetric carbon atom. Either Ra or Rb is the optically active group. X represents

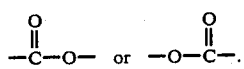

Each of l and m represents 0 or 1.

13 Claims, 7 Drawing Sheets

OTHER PUBLICATIONS

Molecular Crystals & Liquid Crystals, vol. 164, Nov. 1988, pp. 167–178, Gordon and Breach Science Publishers S. A., Montreux, CH; K. Takatoh et al.: "Mesophase transition of series materials containing fluorene, fluorenone and biphenyl structures . . . ".

Mol. Cryst. Liq. Cryst, 1986, vol. 141, pp. 251–266 "Physical Properties of Some Chiral Smectic Liquid Crystals Having 1-Methyl-Alkoxy-Phenyl Group" Inukai et al.

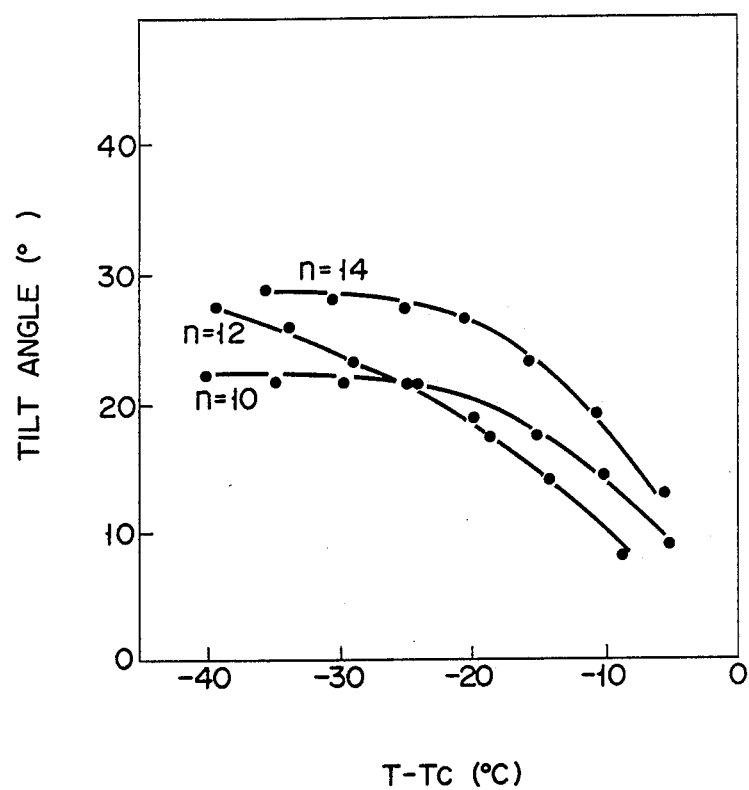
F I G. 3

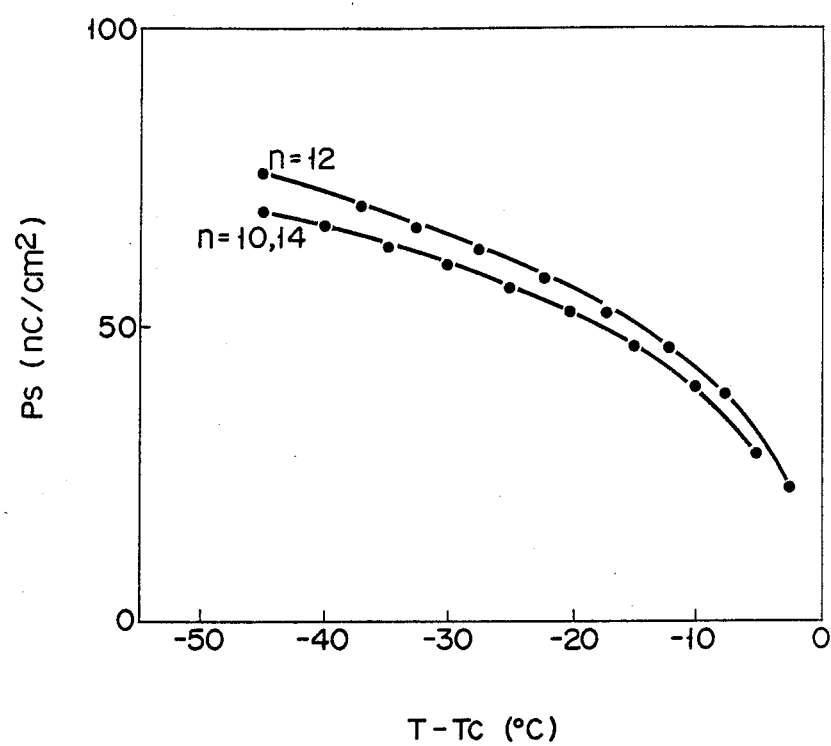
F I G. 4

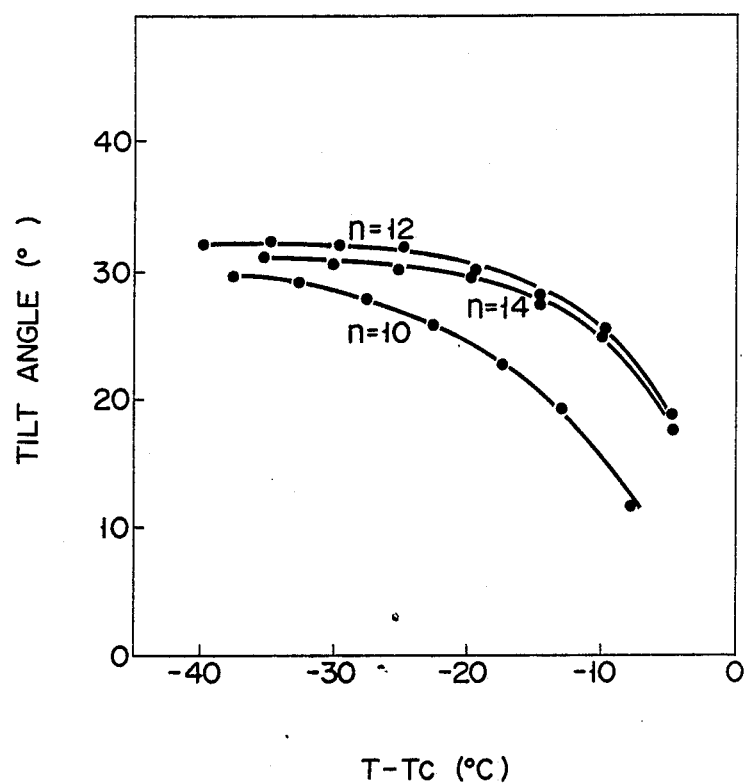
F I G. 5

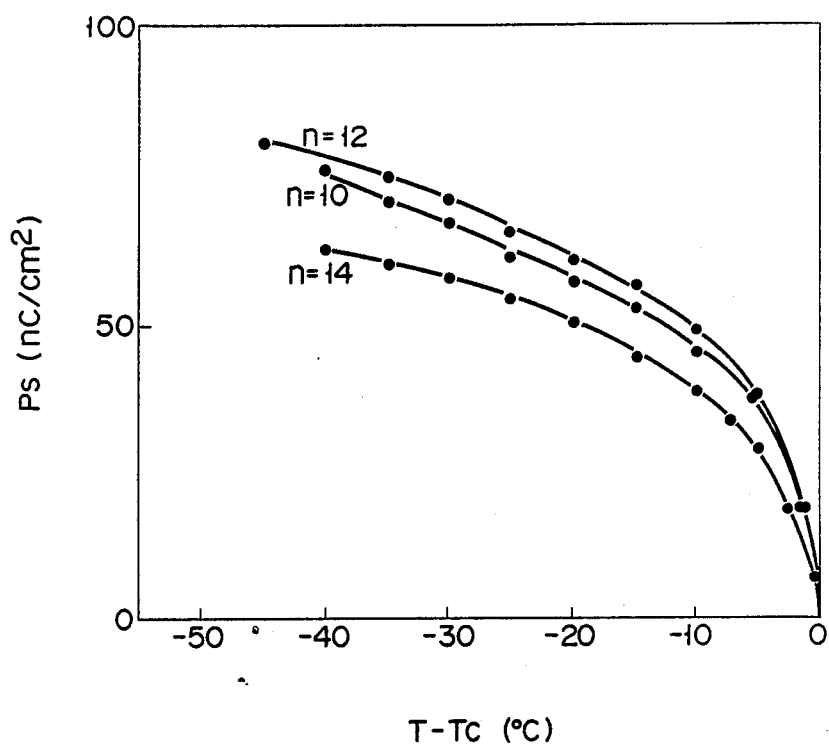
F I G. 7

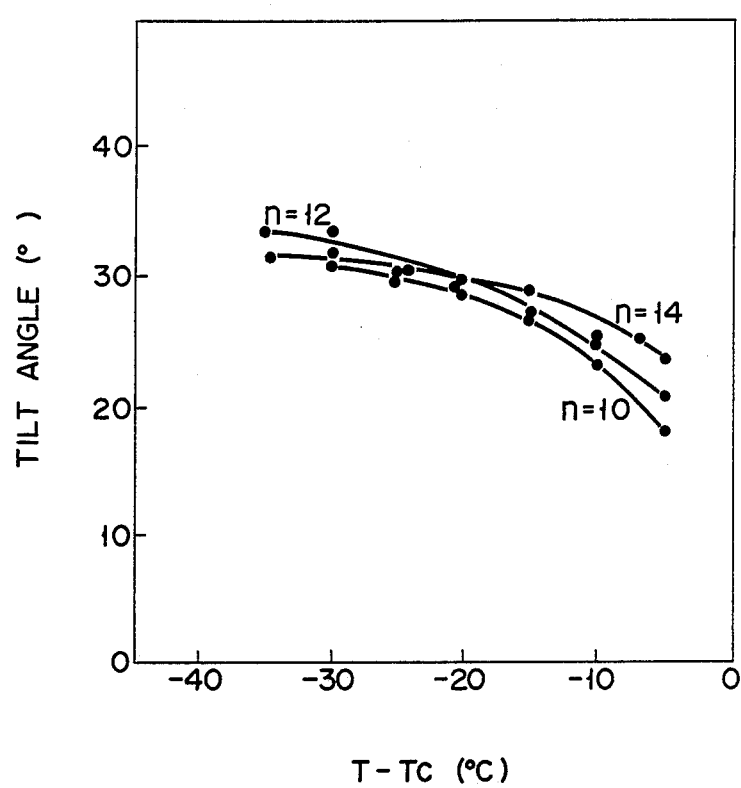
F I G. 8

OPTICALLY ACTIVE LIQUID CRYSTAL COMPOUND AND METHOD OF MANUFACTURING THE SAME, LIQUID CRYSTAL COMPOSITION CONTAINING THE SAME AND LIQUID CRYSTAL DISPLAY DEVICE

BACKGROUND OF THE INVENTION

1. Field of the Invention

The present invention relates to a novel liquid crystal compound and a method of manufacturing the same and, more particularly, to a ferroelectric liquid crystal compound which can exhibit chiral smectic C phase and a method of manufacturing the same. The present invention also relates to a liquid crystal composition containing such a liquid crystal compound, and a liquid crystal display device.

2. Description of the Related Art

Liquid crystals are widely used as the best display material for small flat panel display devices such as portable calculators and time pieces. Recently, liquid crystals are also used in automobile displays and personal computer displays. In addition, liquid crystals have now begun to be used in moving image displays such as small liquid crystal television sets.

Twisted nematic liquid crystals are conventionally used in portable calculators, time pieces, and the like. In display systems using these liquid crystals, however, a response speed is unsatisfactory, and cross-talk is produced. Therefore, it is difficult to apply these liquid crystals to displays such as large screen displays which must have a high response speed.

In order to solve the above problems, a display system such as an active matrix display system using a thin film transistor has been developed. However, a manufacturing cost of devices adopting such a display system is high.

For these reasons, as a display system capable of replacing the display system using twisted nematic liquid crystals, a display system using a ferroelectric liquid crystal was reported by R. B. Mayer et al. in 1975 and has attracted a great deal of attention. This display system has a higher response speed than those of the conventional systems, and a memory effect. Ferro electric liquid crystals used in this system must have a chiral smectic C phase. A number of such ferroelectric liquid crystals are conventionally known.

The conventional ferroelectric liquid crystals are, however, unstable with respect to moisture in air or light, and have narrow temperature ranges within which chiral smectic C phase appears. Therefore, applications of these liquid crystals are limited.

SUMMARY OF THE INVENTION

It is, therefore, an object of the present invention to provide a novel liquid crystal compound exhibiting chiral smectic C phase over a wide temperature range and good thermodynamic stability, and method of manufacturing the same.

It is another object of the present invention to provide a liquid crystal composition containing such a liquid crystal compound and a liquid crystal display device.

According to the present invention, there is provided a compound represented by formula:

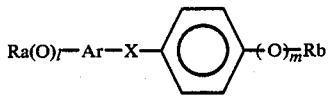

where Ar represents

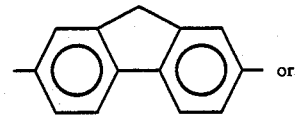

or

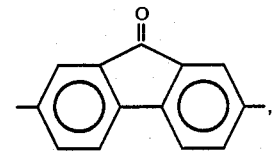

each of Ra and Rb independently represents an optically non-active alkyl group or an optically active group having an asymmetric carbon atom, with the proviso that one of Ra and Rb is the optically active group, X represents

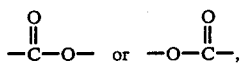

and each of l and m represents 0 or 1.

The liquid crystal compounds of the present invention in which X represents

in the above formula can be manufactured by reacting a carboxylic acid represented by formula:

Ra(O)$_l$—Ar—COOH where Ra, Ar and l are as defined above, or its reactive derivative, with a hydroxy compound represented by formula:

where Rb and m are as defined above.

The liquid crystal compound of the present invention in which X represents

is manufactured by reaction of a hydroxy compound represented by formula:

Ra(O)$_l$—Ar—OH where Ra, Ar and l are as defined above with a carboxylic acid represented by formula:

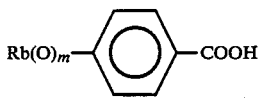

where Rb and m are as defined above or its reactive derivative.

The liquid crystal composition of the present invention contains 5 to 90% by weight, preferably 10 to 60% by weight, of the liquid crystal compound of the present invention.

The liquid crystal display device of the present invention comprises a pair of electrode substrates arranged to oppose each other with a predetermined interval, at least one of them being transparent, and the liquid crystal composition containing the liquid crystal compound of the present invention arranged between the electrode substrates.

BRIEF DESCRIPTION OF THE DRAWINGS

FIGS. 2–3 and 7–8 are graphs showing characteristics of compounds of the present invention;

FIGS. 4 and 5 are graphs showing characteristics of a conventional compound.

DETAILED DESCRIPTION OF THE PREFERRED EMBODIMENTS

Figure 1:
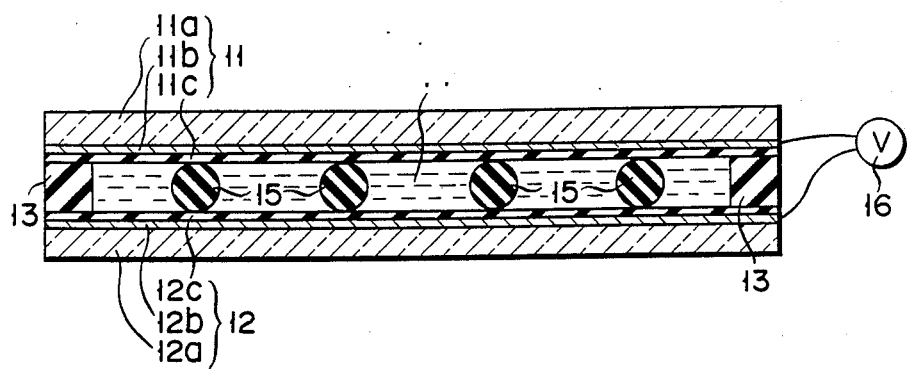
FIG. 1 is a sectional view showing a basic arrangement of a liquid crystal display device.

As described above, the liquid crystal compound of the present invention is represented by formula:

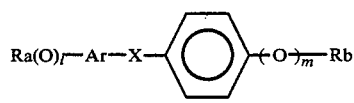
(A)

In formual (A), Ar represents

 or

,

X represents $$-\overset{O}{\underset{\|}{C}}-O- \quad \text{or} \quad -O-\overset{O}{\underset{\|}{C}}-,$$

and each of l and m independently represents 0 or 1.

Each of Ra and Rb is independently an optically non-active alkyl group or an optically active group having an asymmetric carbon atom, and either Ra or Rb is the optically active group. When Ra or Rb is the optically non-active alkyl group (i.e., an alkyl group having no asymmetric carbon atom), it is preferably a straight-chain alkyl group having 3 to 18 carbon atoms in order to widen a temperature range within which chiral smectic C phase appears. Most preferably, the straight-chain alkyl group has 4 to 14 carbon atoms.

When Ra or Rb is the optically active group, it is preferably an optically active alkyl or substituted alkyl group having asymmetric carbon atom C* represented by formula:

$$-\text{(CH}_2\text{)}_n\overset{R^1}{\underset{R^3}{\overset{|}{C^*}}}-R^2 \qquad (B)$$

where each of $R^1$, $R^2$ and $R^3$ independently represents an alkyl group (preferably, an alkyl group having 1 to 18 carbon atoms), halogen, cyano, perfluoroalkyl (preferably, a perfluoroalkyl group having 1 to 18 carbon atoms) or a hydrogen atom, $R^1$, $R^2$ and $R^3$ satisfying conditions $R^1 \neq R^2$, $R^2 \neq R^3$ and $R^3 \neq R^1$ at the same time, and n represents an integer from 0 to 15 (preferably, 0 to 8). Usually 2-methylbutyl group and 2-octyl group are used.

A compound of the present invention represented by formula (A) has a wide temperature range (about 50° C. to about 150° C.) within which chiral smectic C phase appears, and is a ferroelectric liquid crystal.

More specifically, a compound of the present invention represented by formula (A) includes compounds represented by formulas:

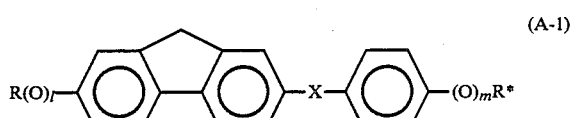
(A-1)

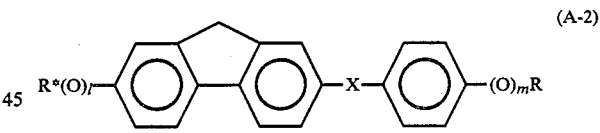
(A-2)

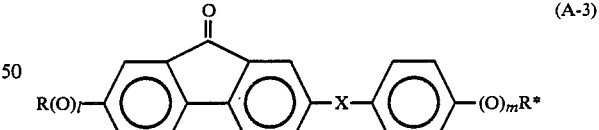
(A-3)

(A-4)

where R represents the optically non-active alkyl group, R* represents the optically active group, and X, l and m are as defined above.

A method of manufacturing the compound of the present invention will be described below.

A compound represented by formula (A) in which X is

is manufactured by reaction of a carboxylic acid represented by formula:

$$Ra(O)_l-Ar-COOH \quad (C)$$

(wherein Ra, Ar and l are as defined above) or its reactive derivative (preferably, an acid chloride) with a hydroxy compound represented by formula:

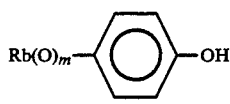  (D)

(wherein Rb and m are as defined above). Preferably, a carboxylic acid represented by formula (C) is first made to react with thionyl chloride by a conventional method to convert it into a corresponding acid chloride represented by the formula:

$$Ra(O)_l-Ar-COCl \quad (C-1)$$

By reaction of the above acid chloride with a hydroxy compound represented by formula (D) in pyridine, a desired compound can be prepared.

A liquid crystal compound of the present invention represented by formula (A) in which X represents

is manufactured by reaction of a hydroxy compound represented by formula:

$$Ra(O)_l-Ar-OH \quad (E)$$

(wherein Ra, Ar and l are as defined above) with a carboxylic acid represented by formula:

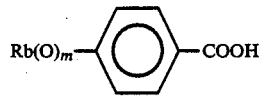  (F)

(wherein Rb and m are as defined above) or its reactive derivative (preferably, an acid chloride). Preferably, a carboxylic acid represented by formula (F) is first made to react with thionyl chloride by a conventional method to convert it into a corresponding acid chloride represented by the formula:

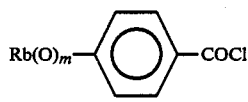  (F-1)

By reaction of the above acid chloride with a hydroxy compound represented by formula (E) in pyridine, a desired compound can be prepared.

A method of manufacturing compounds (C) to (F) as starting compounds in the above reactions will be described below assuming that each of l and m is 1.

Compound of Formula (C)

This compound can be manufactured by the following reaction route:

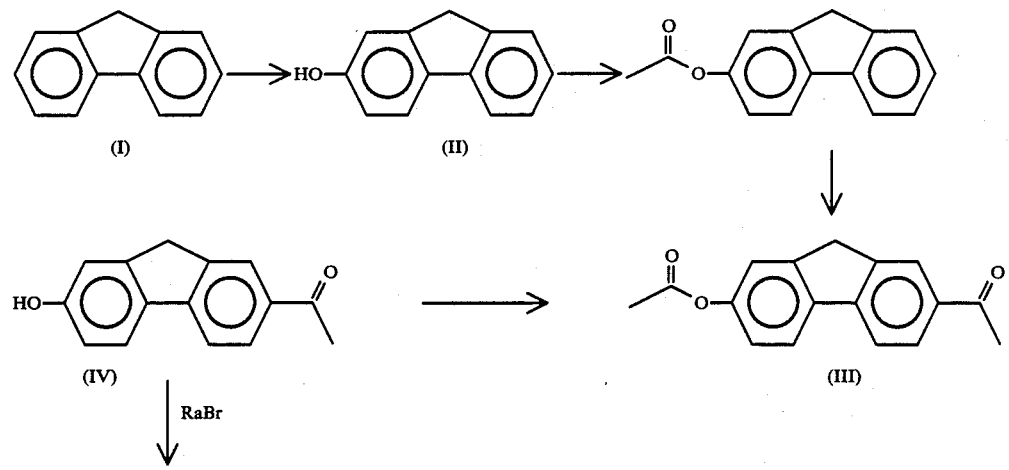

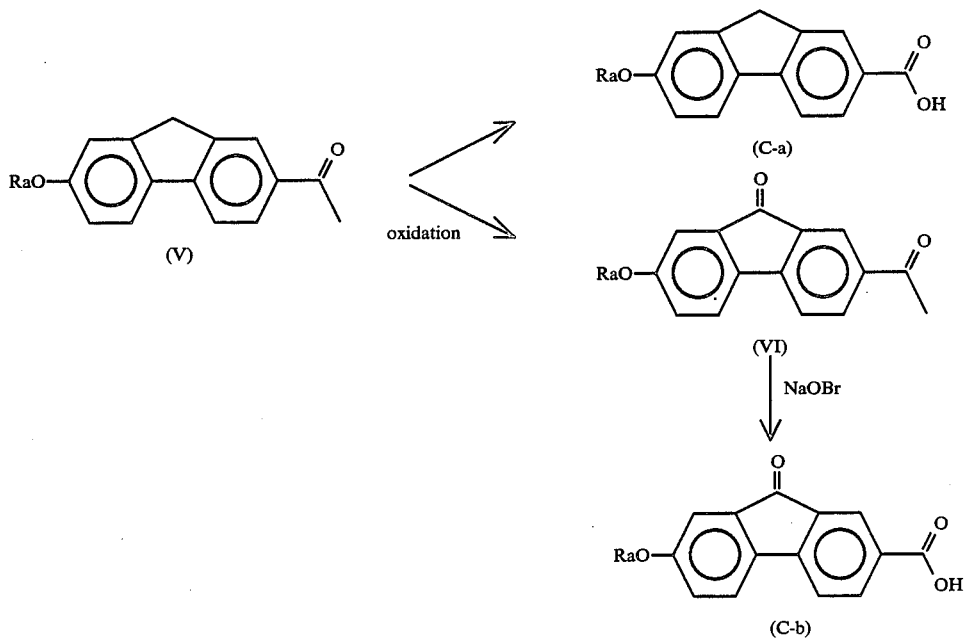

More specifically, 2-hydroxyfluorene (II) is synthesized from commercially available fluorence (I) by, e.g., a 3-stage reaction described in Org. Synth., 1933, 13, 74. Then, the compound of formula (II) is made to react in accordance with a method described by C. H. Coak et al., in J. Org. Chem., 1954, 19, 628 to prepare compound (III). Compound (III) is made to react in accordance with a method described by G. W. gray et al., in J. Chem. Soc., 1957, 3228 to prepare compound (C-a) represented by formula (C) in which Ar represents

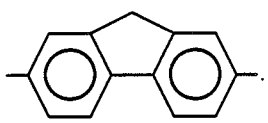

A compound of formula (C) in which Ar represents

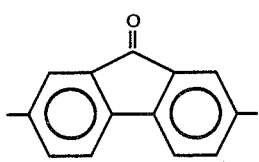

can be prepared by oxidizing a compound of formula (V), followed by treating with NaOBr. This oxidation can be performed by a conventional method using sodium bichromate or ammonium bichromate in acetic acid. The present inventors, however, have found that this oxidation can be efficiently performed by blowing oxygen-containing gas (e.g., $O_1$, air) into the basic solution to manufacture a desired compound with high yield.

Compound of Formula (D)

This compound can be manufactured in accordance with the following reaction route:

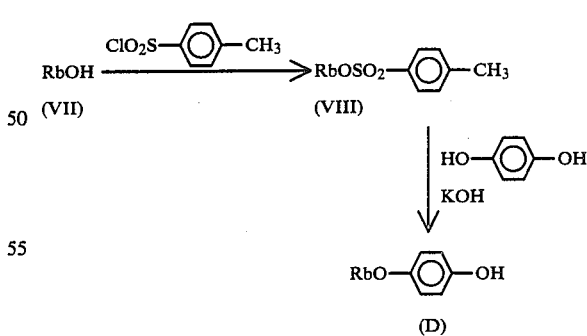

More specifically, alkanol of formula (VII) is made to react with p-toluenesulfonyl acid chloride in pyridine to produce alkanol ester of p-toluenesulfonic acid (VIII). This compound is made to react with hydroquinone to prepare a compound of formula (D).

Compound of Formula (E)

This compound can be manufactured by the following route:

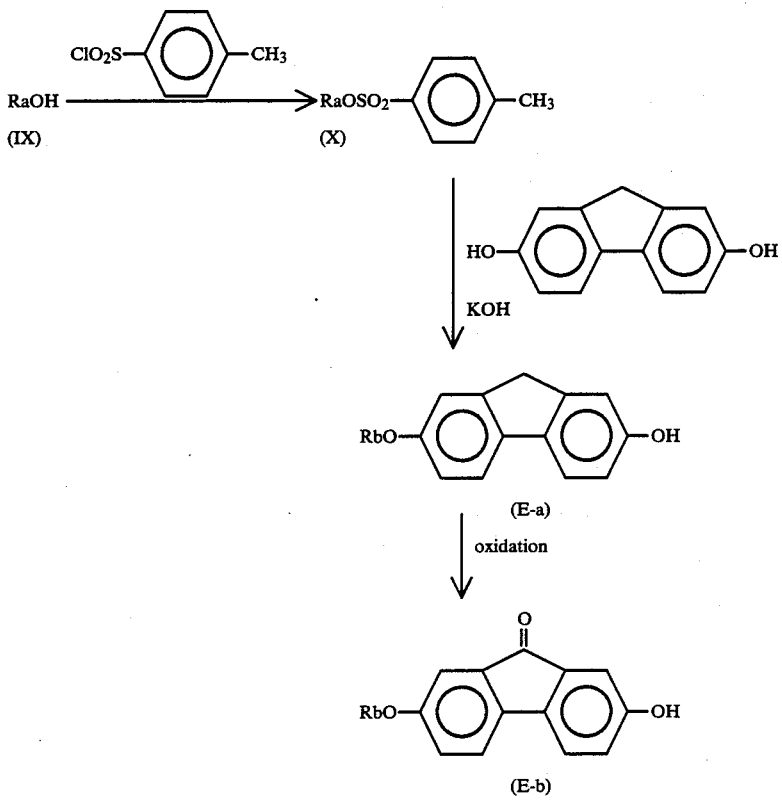

More specifically, alkanol or formula (IX) is made to react with p-toluenesulfonyl acid chloride in pyridine to produce alkanol ester of p-toluenesulfonic acid (X). By reaction of this compound with 2,7-dihydroxyfluorene, compound (E-a) of formula (E) in which Ar represents

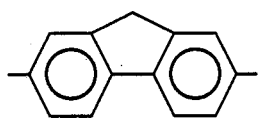

can be prepared.

By oxidizing compound (E-a) following the same procedures as described above, compound (E-b) of formula (E) in which Ar represents

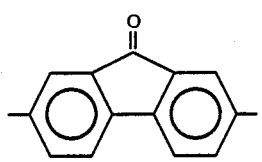

can be prepared.

Compound of Formula (F)

This compound can be manufactured by reaction of a compound of formula (VIII) with p-hydroxybenzoic acid in the presence of potassium hydroxide:

The compounds of the present invention have a wide temperature range within which chira smectic C phase appears and good thermodynamic stability. Therefore, by mixing two or more types of the compounds of the present invention or blending the other ferroelectric liquid crystal, a liquid crystal composition applications of which are less limited can be provided. The liquid crystal composition of the present invention contains 5 to 90% by weight, more preferably 10 to 60% by weight (total) of one or more of the compounds according to the present invention.

Referring to FIG. 1, a liquid crystal display device will be described. This liquid crystal display device has a pair of electrode substrates 11 and 12 arranged to oppose each other with a predetermined interval by sealing material 13 and spacer 15. At least one of electrode substrates 11 and 12 is transparent. Electrode substrates 11 and 12 have structure that transparent electrodes 11b, 12b are formed on glass substrates 11a and 12a, and insulating layers 11c, 12c subjected to an orienting treatment are formed on electrodes 11b and 12b. The electrode substrates 11, 12 are arranged such that electrodes 11b, 12b face each other.

Liquid crystal composition 14 of the present invention is filled in a closed space between the electrode substrates.

Electrodes 11b and 12b are connected to drive source 15 for driving composition 14.

The present invention will be described below by way of its examples.

EXAMPLE 1

First, 7-n-octyloxyfluorene-2-carboxylic acid was synthesized by a conventional method. 33.8 g (0.1 mol) of 7-n-octyloxyfluorene-2-carboxylic acid and 60 ml of thionyl chloride were refluxed under stirring for five hours. Then, excess thionyl chrolide was removed by evaporation and the residue product was recrystallized from n-hexane, thereby preparing 27.8 g (yield= 78%) of a white crystal (acid chloride).

By a reaction between p-toluenesulfonate of (—)-2-methyl-1-butanol and hydroquinone, optically active p-2-methylbutyloxyphenol was synthesized.

Subsequently a solution prepared by dissolving 10.8 g (0.06 mol) of optically active 2-methylbutyloxyphenol in 10 ml of pyridine was dropped in a solution prepared by dissolving 20 g (0.056 mol) of the above acid chloride in 80 ml of pyridine over ten minutes, and then the resultant mixture was heated under stirring in an oil bath at 90° C. for four hours. Thereafter, this pyridine solution was cooled to room temperature and poured into 500 ml of ion-exchanged water to precipitate a product. Then, the resultant precipitate was filtered and subjected to column purification using a column in which 500 g of 10% water-containing silica gel and toluene were filled. The elution solvent was toluene. The obtained roughly purified product was recrystallized twice from ethanol to prepare 15.4 g (yield=55%) of a white needle crystal.

The prepared white needle crystal was dissolved in deuteriochloroform and an NMR spectrum was measured. In addition, elemental analysis of the white needle crystal was performed to obtain a result of C:79.5, H:8.1 and 0:12.6 (calculated values are C:79.20, H:8.00 and 0:12.80).

From the NMR spectrum and the elemental analysis, this white needle crystal was confirmed to be 7-n-octyloxyfluorene-2-carboxylic 4-(2-methylbutyroxy) phenyl ester represented by formula (A-1) wherein R represents n-$C_8H_{17}$, R* represents:

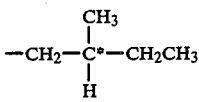

and each of l and m represents 1.

EXAMPLES 2–5

0.1 mol of each of 7-n-heptyloxyfluorene-2-carboxylic acid, 7-n-nonyloxyfluorene-2-carboxylic acid, 7-n-decyloxyfluorene-2-carboxylic acid, and 7-n-undecyloxyfluorene-2-carboxylic acid were used instead of 7-octyloxyfluorene-2-carboxylic acid to perform a reaction following the same procedures as in Example 1, thereby synthesizing optically active chiral 7-n-heptyloxyfluorene-2-carboxylic acid 4-(2-methylbutyroxy)phenyl ester, 7-n-nonyloxyfluorene 2-carboxylic acid 4-(2-methylbutyroxy)phenyl ester, 7-n-decyloxyfluorene-2-carboxylic acid 4-(2-methylbutyroxy)phenyl ester, and 7 n-undecyloxyfluorene2-carboxylic acid 4-(2-methylbutyroxy)phenyl ester. From an NMR spectrum and elemental analysis, each of these compounds was confirmed to have a structure represented by formula (A-1) wherein each of l and m represents 1.

EXAMPLES A & B

Of the five liquid crystal compounds synthesized in Examples 1 to 5, three liquid crystal compounds listed in Table 1 were mixed at weight ratios shown in Table 1, and phase transition temperatures of obtained mixtures C→SmC*, SmC→SmA and SmA→I were measured. The result is shown in Table 1.

TABLE 1

| Ex. No. | Liquid Crystal Material | Weight Ratio | Phase Transition Temperature (°C.) | | |
|---|---|---|---|---|---|
| | | | C → SmC* | SmC* → SmA | SmA → I |
| Example A | 7-n-butyloxyfluorene-2-carboxylic acid 4-(2-methylbutyroxy) phenyl ester | 1 | 63 | 110 | 170 |
| | 7-n-octyloxyfluorene-2-carboxylic acid 4-(2-methylbutyroxy) phenyl ester | 1 | | | |
| | 7-n-nonyloxyfluorene-2-carboxylic acid 4-(2-methylbutyroxy) phenyl ester | 1 | | | |
| Example B | 7-n-octyloxyfluorene-2-carboxylic acid 4-(2-methylbutyroxy) phenyl ester | 1 | 65 | 108 | 172 |
| | 7-n-decyloxyfluorene-2-carboxylic acid 4-(2-methylbutyroxy) phenyl ester | 1 | | | |
| | 7-n-undecyloxyfluorene-2-carboxylic acid 4-(2-methylbutyroxy) phenyl ester | 1 | | | |

EXAMPLES 6–10

7-n-hexyloxyfluorene-2-carboxylic acid, 7-n-oxtyloxyfluorene-2-carboxylic acid, 7-n-decyloxyfluorene-2-carboxylic acid, 7-n-dodecyloxyfluorene-2-carboxylic acid and 7-n-tetradecyloxyfluorene-2-carboxylic acid were reacted with optically active p-(2-methylbutyroxy)phenol following the same procedure as in Example 1, thereby synthesizing compounds represented by formula:

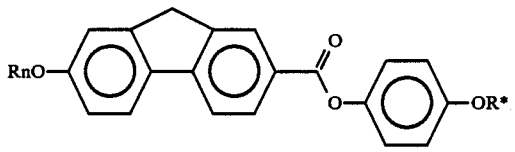

where Rn represents a straight chain alkyl group having n number of carbon atoms. Phase transition temperatures of these compounds are shown in Table 2 below.

TABLE 2

| Ex. No. | R* | n | Phase Transition Temperature (°C.) | | |
|---|---|---|---|---|---|
| | | | C → SmC* | SmC* → SmA | SmA → I |
| 6 | —*⩘ | 6 | 119 | (87) | 208 |
| 7 | | 8 | 117 | (109) | 201 |
| 8 | | 10 | 115 | 137 | 194 |
| 9 | | 12 | 91 | 144 | 187 |
| 10 | | 14 | 86 | 143 | 183 |

EXAMPLES 11–13

7-n-decyloxyfluorene-2-carboxylic acid, 7-n-dodecyloxyfluorene-2-carboxylic acid and 7-n-tetradecyloxyfluorene-2-carboxylic acid were made to react with optically active p-(2-octyroxy)phenol following the same procedures as in Example 1, thereby synthesizing compounds represented by formula:

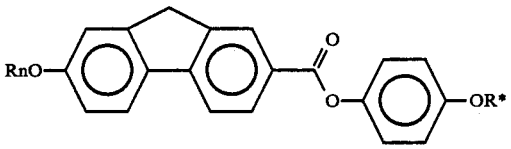

where Rn represents a straight chain alkyl group having n number of carbon atoms. Phase transition temperatures of these compounds are shown in Table 3 below.

TABLE 3

| Ex. No. | R* | n | Phase Transition Temperature (°C.) | | |
|---|---|---|---|---|---|
| | | | C → SmC* | SmC* → SmA | SmA → I |
| 11 | —⩘*⩘⩘⩘ | 10 | 86.6 | 122.5 | 149.3 |
| 12 | | 12 | 87.8 | 130.3 | 146.2 |
| 13 | | 14 | 81.9 | 127.4 | 140.9 |

Figure 2:
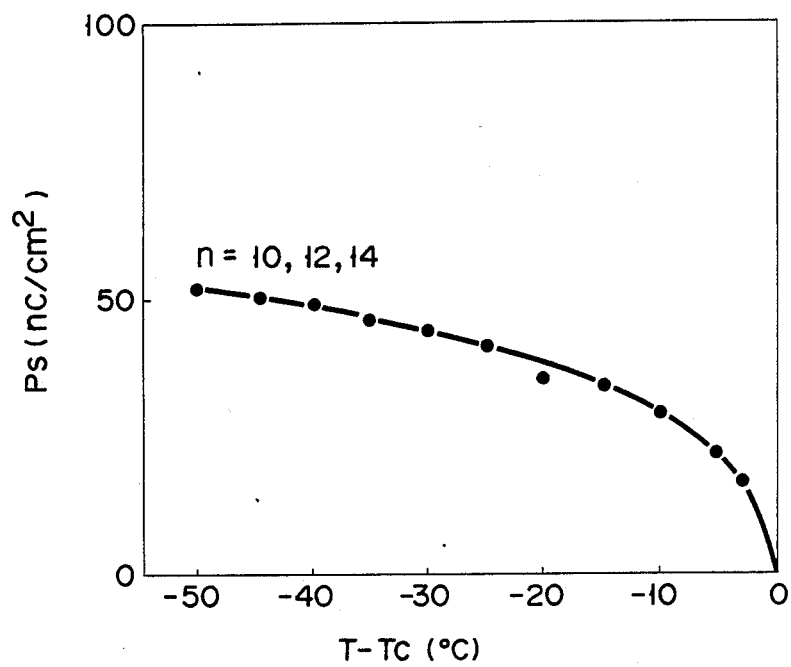

A relationship between spontaneous polarization Ps and a temperature (T−Tc) of these compounds is shown in FIG. 2, and a relationship between a tilt angle and the temperature (T−Tc) is shown in FIG. 3.

For purpose of comparison, a relationship between spontaneous polarization Ps and a temperature (T−Tc) of a compound represented by formula:

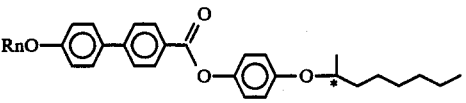

(wherein n represents 10, 12 or 14) is shown in FIG. 4, and a relationship between a tilt angle and the temperature (T−Tc) thereof is shown in FIG. 5.

EXAMPLE 14

An optically active 7-(2-octyloxy)-fluorene 2carboxylic acid was prepared in accordance with a method described by G. W. Gray et al. in J. Chem. Soc., 1957, 3228 using optically active 2-octyl bromide instead of the n alkyl bromide. The obtained carboxylic acid and 4-n-octyl phenol were reacted as in Example 1 to prepare a white crystal with a yield of 87%. The white crystal was confirmed to be optically active 7-(2-octyloxy)-fluorene-2-carboxylic acid 4-n-octyl phenyl ester by the NMR and elemental analyses.

EXAMPLE 15

Optically active 7-n-octyloxy-fluorene-2-carboxylic acid 4-(2-octyl)phenyl ester was prepared by reacting 7-n-octyloxy-fluorene-2-carboxylic acid with optically active 4-(2-octyl)phenol as in Example 1.

EXAMPLE 16

According to a known method, optically active 2-octyl bromide and 2,7-dihydroxyfluorene were reacted in ethanol in the presence of potassium hydroxide. The resultant reaction mixture was purified by a column chromatography and recrystallization to obtain optically active 2-hydroxy-7-(2-octyloxy)-fluorene.

The obtained optically active 2-hydroxy-7-(2-octyloxy)-fluorene and 4-n-nonyl benzoic acid chloride were reacted in pyridine. The resultant reaction mixture was purified by a column chromatography and recrystallization to obtain a while needle crystal. The NMR and elemental analyses indicated that the needle crystal was optically active 4-n-nonyl benzoic acid 7-(2-octyloxy)-2-fluorene ester.

EXAMPLE 17

2-acetyl-7-n-octyloxyfluorene was prepared by the known method.

The obtained 2-acetyl-7-n-octyloxyfluorene, 5.00 g, was dissolved in 200 ml of methyl ethyl ketone. 3.00 g of potassium hydroxide were added to the solution at room temperature under stirring while blowing air into the solution at atmosphere, and the resultant solution was further stirred for 3 hours at room temperature. Then the solution was neutralized with hydrochloric acid to form a precipitate. The precipitate was collected and recrystallized twice from ethanol to obtain 4.17 g (yield of 80%) of a yellow needle crystal.

The obtained crystal was dissolved in deuteriochloroform, and an NMR spectrum was measured. In addition, elemental analysis of the crystal was performed to obtain a result of C:78.9, H:7.3, 0:13.9 (calculated values are C:78.86, H:7.43, 0:13.71).

From the NMR spectrum and elemental analysis, the yellow needle crystal was confirmed to be 2-acetyl-7-n-octyloxyfluorenone in which the methylene group bridging the two benzene rings of the raw material 2-acetyl-7-n-octyloxyfluorene has been oxidized into ketone.

The obtained 2-acetyl-7-n-octyloxyfluorenone was subjected to oxidation of its acetyl group in accordance with a method described by G. W. Gray in J. Chem. Soc., 1957, 3228 to obtain 7-n-octyloxyfluorenone-2-carboxylic acid.

Then, 1.75 g (0.005 mol) of 7-n-octyloxyfluorenone-2-carboxylic acid and 10 ml of thionyl chloride were refluxed under stirring for an hour. Subsequently, excess thionyl chloride was removed by evaporation, and the resultant material was recrystallized from n-hexane, thereby obtaining 1.76 g (yield=75%) of a yellowish white crystal (acid chloride).

Figure 6:
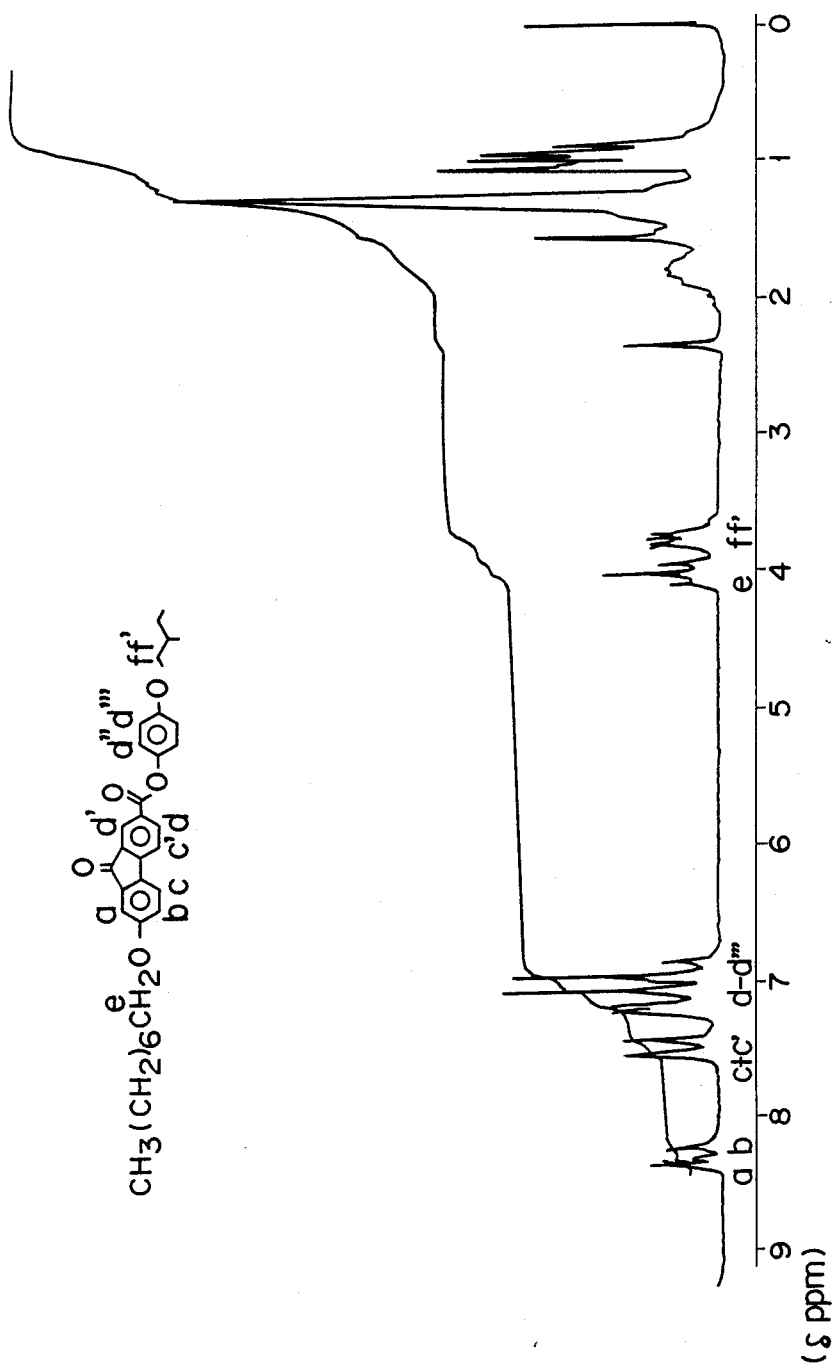
FIG. 6 is a graph showing an NMR spectrum of a compound according to an embodiment of the present invention.

Then, a solution prepared by dissolving 0.947 g ($5.26 \times 10^{-3}$ mol) of 4-(+)-2-methylbutoxyphenol in 5 ml of pyridine was dropped in a solution prepared by dissolving 1.39 g ($3.75 \times 10^{-3}$ mol) of the acid chloride in 10 ml of pyridine over five minutes, and then the resultant solution was heated under stirring in an oil bath at 90° C. for four hours. This pyridine solution was cooled to room temperature and poured into 500 ml of ion-exchanged water to precipitate a product. The produced precipitate was filtered and recrystallized three times from ethanol to obtain 1.55 g ($3.01 \times 10^{-3}$ mol, 80%) of a yellow needles. Elemental analysis of the crystal was performed to obtain a result of C:77.1, H:7.5 and 0:1.52 (calculated values are C:77.04, H:7.39 and 0:15.56). FIG. 6 shows an NMR spectrum of a deuteriochloroform solution of the crystal.

From the NMR spectrum and the elemental analysis, as well as the IR spectrum and the MS spectrum, the yellow crystals were confirmed to be 7-n-octyloxyfluorenone-2-carboxylic acid 4-(+)-2-methylbutoxyphenyl ester represented by formula (A-3) wherein R represents n—$C_8H_{17}$, R* represents:

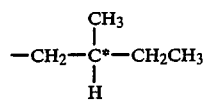

and each of l and m represents 1.

EXAMPLES 18–22

0.1 mol of each of 7-n-hexyloxyfluorenone-2-carboxylic acid, 7-n-nonyloxyfluorenone-2-carboxylic acid, 7-n-decyloxyfluorenone-2-carboxylic acid, 7-n-dodecyloxyfluorenone-2 carboxylic acid and 7-n-tetradecyloxyfluorenone-2-carboxylic acid were used instead of 7-n-octyloxyfluorenone-2-carboxylic acid to perform a reaction following the same procedures as in Example 17, thereby synthesizing optically active 7-n-hexyloxyfluorenone-2-carboxylic acid 4-(+)-2-methylbutoxyphenyl ester, 7-n-nonyloxy-fluorenone-2carboxylic acid 4-(+)-2-methylbutoxyphenyl ester, 7-n-decyloxyfluorenone-2-carboxylic acid 4-(+)-2-methylbutoxyphenyl ester, 7-n-dodecyloxy-fluorenone-2-carboxylic acid 4-(+)-2-methylbutoxyphenyl ester and 7-n tetradecyloxyfluorenone-2-carboxylic acid 4-(+)-2-methylbutoxyphenyl ester. From an NMR spectrum, elemental analysis, an IR spectrum and a mass spectrum, each of these compounds was confirmed to have a structure of formula (A-3) wherein each of l and m represents 1.

EXAMPLES C–G

Of the six liquid crystal compounds synthesized in Examples 17 to 22, three liquid crystal compounds listed in Table 4 were mixed at weight ratios shown in Table 4, and phase transition temperatures of obtained mixtures C→SmC*, SmC*→SmA and SmA→I were measured. The result is shown in Table 4.

TABLE 4

| Ex. No. | Liquid Crystal Material | Weight Ratio | Phase Transition Temperature (°C.) | | |
|---|---|---|---|---|---|
| | | | C → SmC* | SmC* → SmA | SmA → I |
| Example C | 7-hexylfluorenone-2-carboxylic acid 4-(+)-2-methylbutoxyphenyl ester | 1 | 60 | 105 | 155 |
| | 7-octyloxyfluorenone-2-carboxylic acid 4-(+)-2-methylbutoxyphenyl ester | 1 | | | |
| | 7-nonyloxyfluorenone-2-carboxylic acid 4-(+)-2-methylbutoxyphenyl ester | 1 | | | |
| Example D | 7-decyloxyfluorenone-2-carboxylic acid 4-(+)-2-methylbutoxyphenyl ester | 1 | 63 | 113 | 156 |
| | 7-dodecyloxyfluorenone-2-carboxylic acid 4-(+)-2-methylbutoxyphenyl ester | 1 | | | |
| | 7-tetradecyloxyfluorenone-2-carboxylic acid 4-(+)-2-methylbutoxyphenyl ester | 1 | | | |
| Example E | 7-hexyloxyfluorenone-2-carboxylic acid 4-(+)-2-methylbutoxyphenyl ester | 1 | 68 | 115 | 150 |
| | 7-octyloxyfluorenone-2-carboxylic acid 4-(+)-2-methylbutoxyphenyl ester | 1 | | | |
| | 7-dodecyloxyfluorenone-2-carboxylic acid 4-(+)-2-methylbutoxyphenyl ester | 1 | | | |
| Example F | 7-hexyloxyfluorenone-2-carboxylic acid 4-(+)-2-methylbutoxyphenyl ester | 1 | 63 | 118 | 150 |
| | 7-octyloxyfluorenone-2-carboxylic acid 4-(+)-2-methylbutoxyphenyl ester | 1 | | | |
| | 7-tetradecyloxyfluorenone-2-carboxylic acid 4-(+)-2-methylbutoxyphenyl ester | 1 | | | |
| Example G | 7-hexyloxyfluorenone-2-carboxylic acid 4-(+)-2-methylbutoxyphenyl ester | 1 | 62 | 113 | 152 |

TABLE 4-continued

| Ex. No. | Liquid Crystal Material | Weight Ratio | Phase Transition Temperature (°C.) | | |
|---|---|---|---|---|---|
| | | | C → SmC* | SmC* → SmA | SmA → I |
| | 7-octyloxyfluorenone-2-carboxylic acid 4-(+)-2-methylbutoxyphenyl ester | 1 | | | |
| | 7-tetradecylfluorenone-2-carboxylic acid 4-(+)-2-methylbutoxyphenyl ester | 0.5 | | | |

EXAMPLES 23–27

7-n-hexyloxyfluorenone-2-carboxylic acid, 7-n-octyloxyfluorenone-2-carboxylic acid, 7-n-decyloxyfluorenone-2-carboxylic acid, 7-n-dodecyloxyfluorenone-2-carboxylic acid and 7-n-tetradecyloxyfluorenone 2-carboxylic acid were reacted with optically active p-(2-methylbutyloxy)phenol following the same procedures as in Example 17, thereby synthesizing compounds represented by formula:

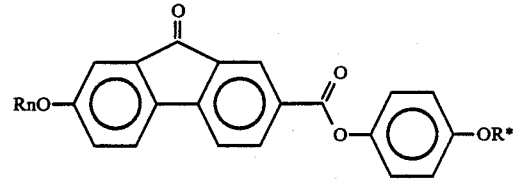

(wherein Rn represents a linear alkyl group having n carbon atoms). Phase transition temperatures of these compounds are shown in Table 6 below.

TABLE 6

| Ex. No. | R* | n | Phase Transition Temperature (°C.) | | |
|---|---|---|---|---|---|
| | | | C → SmC* | SmC* → SmA | SmA → I |
| 25 | ⎯⎯*⎯⎯⎯⎯⎯⎯ | 10 | 81.0 | 117.5 | 126.7 |
| 26 | | 12 | 80.9 | 122.5 | 125.9 |
| 27 | | 14 | 79.0 | — | 115.0 (SmC* → I) |

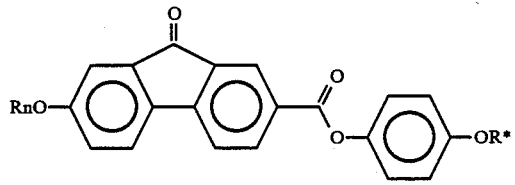

(wherein Rn represents a straight chain alkyl group having n number of carbon atoms). Phase transition temperatures of these compounds are shown in Table 5 below.

TABLE 5

| Ex. No. | R* | n | Phase Transition Temperature (°C.) | | |
|---|---|---|---|---|---|
| | | | C → SmC* | SmC* → SmA | SmA → I |
| 20 | ⎯*⎯⎯ | 6 | 100 | 125 | 157* |
| 21 | | 8 | 101 | 140 | 158 |
| 22 | | 10 | 112 | 157 | 166 |
| 23 | | 12 | 104 | 158 | 163 |
| 24 | | 14 | 95 | — | 147 |

*This compound has cholesteric phase at a high-temperature portion of an SmA phase.

EXAMPLES 28–30

7-n-decyloxyfluorenone-2-carboxylic acid, 7-n-dodecyloxyfluorenone-2-carboxylic acid and 7-n-tetradecyloxyfluorenone-2-carboxylic acid were reacted with optically active p-(2-octyroxy)phenol following the same procedures as in Example 17, thereby synthesizing compounds represented by formula:

A relationship between spontaneous polarization Ps and a temperature (T−Tc) of these compounds is shown in FIG. 7, and a relationship between a tilt angle and the temperature (T−Tc) thereof is shown in FIG. 8.

EXAMPLE 31

Optically active 7-(2-octyloxy)-fluorenone-2-carboxylic acid was prepared in accordance with a method described by G. W. Gray et al. in J. Chem. Soc., 1957, 3228 using an optically active 2 octyl bromide instead of the n-alkyl bromide. The obtained carboxylic acid and 4-n-octyl phenol were reacted as in Example 17 to prepare yellow needles with a yield of 85%. The needles were confirmed to be optically active 7-(2-octyloxy)-fluorenone-2-carboxylic acid 4-n-octyl phenyl ester by the NMR and elemental analyses.

EXAMPLE 32

According to a known method, optically active 2-octyl bromide and 2,7-dihydroxylfluorene were reacted in ethanol in the presence of potassium hydroxide. The resultant reaction mixture was purified by a column chromatography and recrystallization to obtain optically active 2-hydroxy-7-(2-octyloxy)-fluorenone.

The obtained optically active 2-hydroxy-7-(2-oxtyloxy)-fluorenone and 4-n-nonyl benzoic acid chloride were reacted in pyridine. The resultant reaction mixture was purified by a column chromatography and recrystallization to obtain yellow needles. The NMR and elemental analyses indicated that the needles were optically active 4-n-nonyl benzoic acid 7-(2-octyloxy)2-fluorenone ester.

EXAMPLE H liquid crystal composition exhibited the chiral smectic C phase was −10° C. to 95° C.

TABLE 7

| No. | Structural Formula | wt % |
|---|---|---|
| 1 | CH$_3$(CH$_2$)$_7$O—[fluorene]—C(=O)O—[phenyl]—O—*—C$_6$H$_{13}$ | 10.0 |
| 2 | CH$_3$(CH$_2$)$_9$O—[fluorene]—C(=O)O—[phenyl]—O—*—C$_6$H$_{13}$ | 10.0 |
| 3 | C$_6$H$_{13}$—*—O—[fluorene]—C(=O)O—[phenyl]—(CH$_2$)$_7$CH$_3$ | 10.0 |
| 4 | CH$_3$(CH$_2$)$_8$—[phenyl]—C(=O)O—[fluorene]—O—*—C$_6$H$_{13}$ | 10.0 |
| 5 | CH$_3$(CH$_2$)$_7$O—[phenyl]—C(=O)O—[phenyl]—O—*—C$_6$H$_{13}$ | 5.0 |
| 6 | CH$_3$(CH$_2$)$_6$—[phenyl]—C(=O)O—[phenyl]—CH$_2$—*—C$_2$H$_5$ | 5.0 |
| 7 | CH$_3$(CH$_2$)$_3$—[phenyl]—C(=O)O—[phenyl]—CH$_2$—*—C$_2$H$_5$ | 5.0 |
| 8 | CH$_3$(CH$_2$)$_7$—[pyrimidine]—[phenyl]—O—*—C$_2$H$_5$ | 20.0 |
| 9 | CH$_3$(CH$_2$)$_7$—[pyrimidine]—[phenyl]—*—C$_6$H$_{13}$ | 15.0 |
| 10 | CH$_3$(CH$_2$)$_5$—O—[pyrimidine]—[phenyl]—O—*—C$_6$H$_{13}$ | 10.0 |

As shown in Table 7, ten ferroelectric liquid crystal compounds including the liquid crystal compounds of the present invention were mixed to prepare a liquid crystal composition. A temperature range in which this liquid crystal composition exhibited the chiral smectic C phase was −10° C. to 95° C.

A liquid crystal cell having a structure as shown in FIG. 1 was manufactured using the liquid crystal composition of Example H. An orienting treatment was performed by coating a 2.5% solution of polyimide JIB available from Japan Synthetic Rubber Co., Ltd. on a substrate and then drying and rubbing the coating. A response speed of this cell was 250 μs at room temperature (25° C.).

EXAMPLE I

As shown in Table 8, ten ferroelectric liquid crystal compounds including the liquid crystal compounds of the present invention were mixed to prepare a liquid crystal composition. A temperature range in which this liquid crystal composition exhibited the chiral smectic C phase was −5° C. to 100° C.

TABLE 8

| No. | Structural Formula | wt % |
|---|---|---|
| 1 | | 10.0 |
| 2 | | 10.0 |
| 3 | | 10.0 |
| 4 | | 10.0 |
| 5 | | 5.0 |
| 6 | | 5.0 |
| 7 | | 20.0 |
| 8 | | 5.0 |
| 9 | | 15.0 |

TABLE 8-continued

| No. | Structural Formula | wt % |
|---|---|---|
| 10 | CH₃(CH₂)₅—O—[pyridine]—[phenyl]—O—*—C₇H₁₅ | 10.0 |

A liquid crystal cell was manufactured using the above liquid crystal composition following the same procedures as in Example H. A response speed of this cell was 265 μs at room temperature (25° C.).

EXAMPLE J

As shown in Table 9 below, ten ferroelectric liquid crystals including the liquid crystal compounds of the present invention were mixed to prepare a liquid crystal composition. A temperature range in which this liquid crystal composition exhibited the chiral smectic C phase was −5° C. to 90° C.

TABLE 9

| No. | Structural Formula | wt % |
|---|---|---|
| 1 | CH₃(CH₂)₇O—[fluorenone]—C(O)O—[phenyl]—O—*—C₇H₁₅ | 10.0 |
| 2 | CH₃(CH₂)₉O—[fluorenone]—C(O)O—[phenyl]—O—*—C₇H₁₅ | 10.0 |
| 3 | C₇H₁₅—*—O—[fluorenone]—C(O)O—[phenyl]—(CH₂)₇CH₃ | 10.0 |
| 4 | CH₃(CH₂)₈—[phenyl]—C(O)O—[fluorenone]—O—*—C₇H₁₅ | 10.0 |
| 5 | CH₃(CH₂)₇O—[phenyl]—C(O)O—[phenyl]—O—*—C₇H₁₅ | 5.0 |
| 6 | CH₃(CH₂)₆—[phenyl]—C(O)O—[phenyl]—*—C₂H₅ | 5.0 |
| 7 | CH₃(CH₂)₃—[phenyl]—C(O)O—[phenyl]—*—C₂H₅ | 5.0 |

TABLE 9-continued

| No. | Structural Formula | wt % |
|---|---|---|
| 8 | 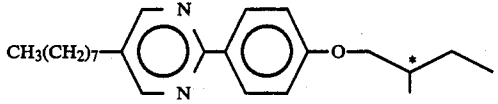 | 20.0 |
| 9 | 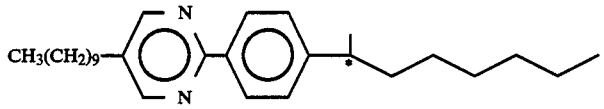 | 15.0 |
| 10 | 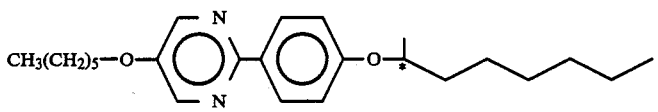 | 10.0 |

A liquid crystal cell was manufactured using the above liquid crystal composition following the same procedures as in Example H. A response speed of this cell was 245 μs at room temperature (25° C.).

As has been described above, the liquid crystal compound of the present invention have a wide temperature range over which chiral smectic C phase appears and good stability and therefore can be used in a liquid crystal display device without not much limiting its applications.

What is claimed is:

1. A compound of the formula:

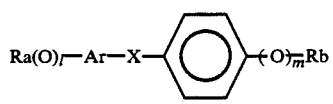

wherein Ar represents

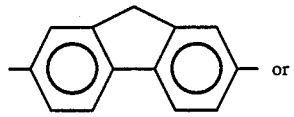 or

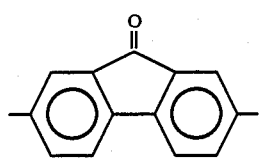

each of Ra and Rb independently representing an optically non-active alkyl group which i a straight-chain alkyl group having 3 to 18 carbon atoms or an optically active group having the formula:

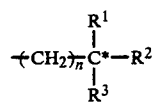

wherein each of $R^1$, $R^2$ and $R^3$ independently represents a $C_1$–$C_{18}$ alkyl group or hydrogen atom; $R^1$, $R^2$ and $R^3$ satisfying conditions $R^1 \neq R^2$, $R^2 \neq R^3$ and $R^3 \neq R^1$ at the same time, wherein at least one of said $R^1$, $R^2$ and $R^3$ is methyl, and wherein at least one of Ra and Rb is said optically active group, X represents

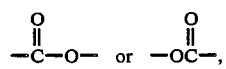

n represents an integer of from 0 to 15 and each of l and m represent 0 or 1.

2. The compound according to claim 1, wherein n is 0 to 8.

3. The compound according to claim 2, wherein said optically non-active group is a straight chain alkyl group having 4 to 14 carbon atoms.

4. The compound according to claim 1, represented by formula:

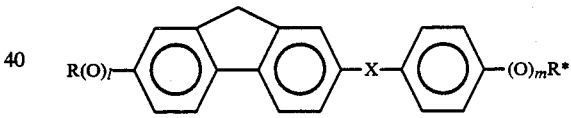

where R represents said optically non-active group, R* represents said optically active group, and X, l and m are as defined above.

5. The compound according to claim 4, wherein said optically active group is 2-methylbutyl group or 2-octyl group and said optically non-active group is a straight chain alkyl group having 4 to 14 carbon atoms.

6. The compound according to claim 1, represented by formula:

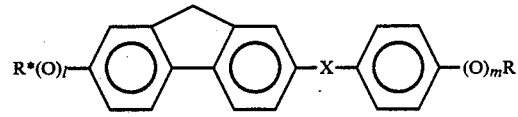

where R represents said optically non-active group, R* represents said optically active group, and X, l and m are as defined above.

7. The compound according to claim 6, wherein said optically active group is 2-methylbutyl group or 2-octyl group and said optically non-active group is a straight chain alkyl group having 4 to 14 carbon atoms.

8. The compound according to claim 1, represented by formula:

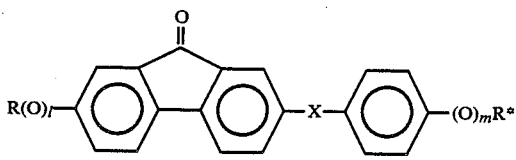

where R represents said optically non-active group, R* represents said optically active group, and X, l and m are as defined above.

9. The compound according to claim 8, wherein said optically active group is 2-methylbutyl group or 2-octyl group and said optically non-active group is a linear alkyl group having 4 to 14 carbon atoms.

10. The compound according to claim 1, represented by formula:

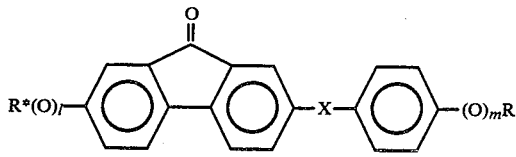

where R represents said optically non-active group, R* represents said optically active group, and X, l and m are as defined above.

11. The compound according to claim 10, wherein said optically active group is 2-methylbutyl group or 2-octyl group and said optically non-active group is a straight chain alkyl group having 4 to 14 carbon atoms.

12. A liquid crystal composition containing 5 to 90% by weight at least one compound of claim 1.

13. A liquid crystal display device comprising:
a pair of electrode substrates arranged to oppose each other with a predetermined interval, at least one of said pair of electrode substrates being transparent; and
a liquid crystal composition arranged between said pair of electrode substrates and containing at least one compound of claim 1.

* * * * *